June 4, 1968 G. HESS 3,387,183
SYSTEM FOR CORRECTING PHASE SEQUENCE
Filed Nov. 4, 1965
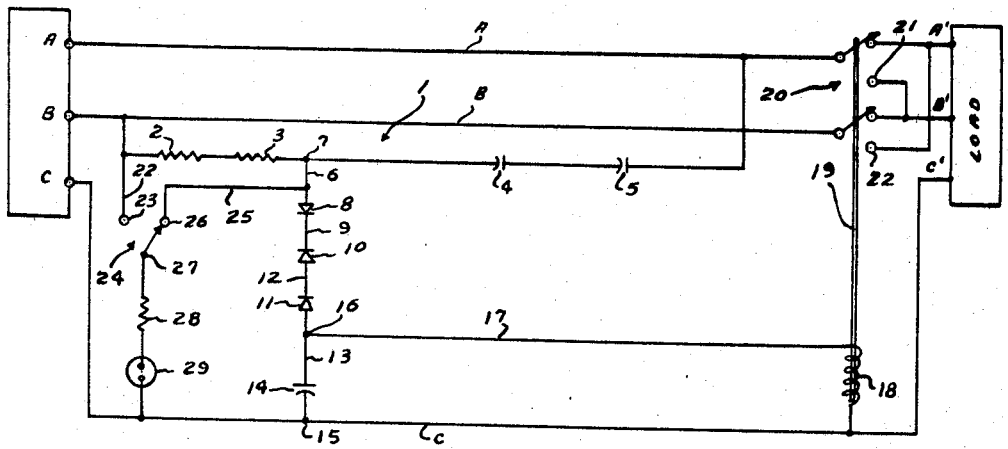
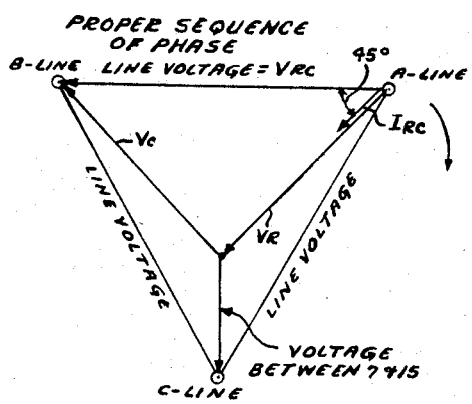
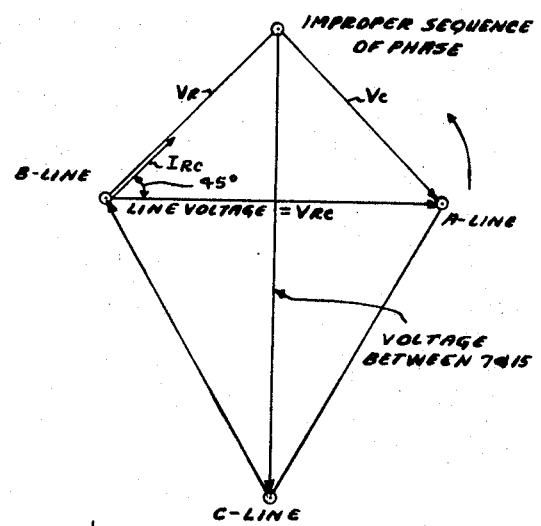
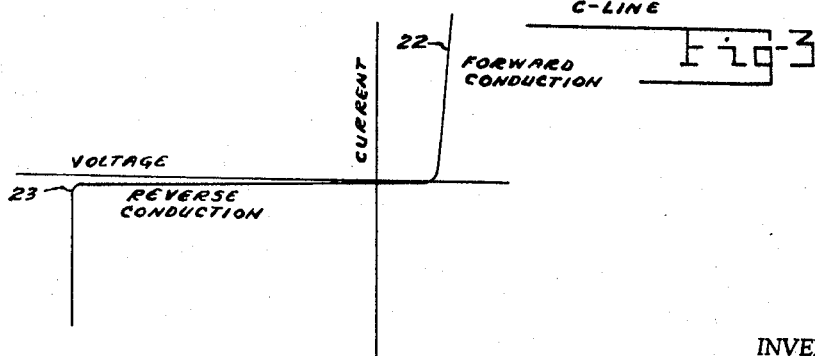
INVENTOR
GARTH HESS
BY Harry A. Herbert Jr.
Herbert H. Brown
ATTORNEYS

United States Patent Office 3,387,183
Patented June 4, 1968

3,387,183
SYSTEM FOR CORRECTING PHASE SEQUENCE
Garth Hess, Upland, Calif., assignor to the United States of America as represented by the Secretary of the Air Force
Filed Nov. 4, 1965, Ser. No. 506,912
7 Claims. (Cl. 317—47)

ABSTRACT OF THE DISCLOSURE

A system for correcting improper phase sequence in a three-phase circuit. The system employs a reactive network connected between two of the phase conductors and a connection between an intermediate point on the network and the third phase conductor. This connection includes a silicon rectifier, one or more Zener diodes and also a condenser. A connection is taken from a point between the Zener diode and the condenser to one end of a solenoid actuator. The other end of the solenoid is connected to the third phase conductor. A slidable core passes through the solenoid, and the core is secured at the end remote from the solenoid to a pivoted switch which, when operated by the solenoid, serves to interchange two of the phase conductors which have been improperly connected. An auxiliary circuit is also connected from the said intermediate point on the network to the third phase conductor through a glow tube to provide a visual indication of an improper phase condition.

---

The present invention relates to a system for indicating and correcting an improper phase sequence in a three phase circuit.

Many valuable pieces of portable equipment which contain or are operated by a three phase motor sustain costly damage due to the motor running backwards when an inadvertent connection to a power source of wrong phase sequence is made. It is therefore essential that the proper phase sequence, not only be indicated, but also be immediately corrected if it is wrong.

The primary object of the invention is to provide an improved system by which inverted wires of a three phase circuit can be detected and changes in the circuit automatically made to restore a normal phase relation.

Another object is to provide in a three phase system, in which the sequence of the phases had been inadvertently reversed, an improved system for detecting the reversed sequence and for automatically breaking the circuit as a result of that detection, and reconnecting the phases in proper sequence.

Still another object is to provide a phase sequence correcting system which employs "Zener" diodes to advantage when reversing an incorrect phase sequence.

Still another object is to provide an improved method for automatically indicating and correcting an improper phase sequence in a plural phase alternating current circuit.

A more general object is to provide in a three phase circuit, an improved system which combines the function of an incorrect phase sequence indicator and an automatic phase sequence correction device.

These objects are attained in brief by providing a detecting circuit connected across the three phase circuit and which includes a reactive element of suitable type for shifting the phase of the current with respect to the impressed voltage to obtain a large disparity between the in-phase and out-of-phase peak voltages. The resulting abnormal peak voltage is employed to break down one or more Zener diodes so as to provide a low resistance path for rectified current which response to the peak voltage and then causing the rectified current to operate a phase correcting device.

The invention will be better understood when reference is made to the following specification and drawings in which:

FIG. 1 represents the improved system and structure for detecting and correcting an incorrect phase sequence;

FIG. 2 shows a vector diagram of a three phase circuit in proper phase sequence but in which a capacitative network has been introduced to provide a leading current phase angle;

FIG. 3 depicts a somewhat similar diagram by showing the effect of a similar network within the system when the phase sequence is incorrect; and FIG. 4 illustrates a current-voltage characteristic of a typical "Zener" diode which has been found to be useful in the practice of my invention.

Referring to FIG. 1, there are shown three line conductors A, B, and C of a three phase, 115 volts circuit, or other suitable voltage. This circuit supplies energy to a three phase load, as indicated, which may comprise a motor, transformer, meter, etc.

The invention is predicated on the fact that the wires A, B have been inadvertently reversed so that the phases are not in proper sequence. In the case of a motor-driven load and the motor were caused to reverse due to an incorrect phase, the load might be damaged unless corrective action were immediately instituted. As stated hereinbefore, the purpose of the invention is not only to detect an improper phase sequence but to reverse the erring phase before the condition has progressed to the damage stage.

Across the line conductors A, B, or more properly B, A, since these wires have been inadvertently transposed, I connect a reactive circuit generally indicated at 1, and formed of one or more resistors 2, 3 and a pair of condensers 4, 5. These elements are connected in series. A conductor 6 is taken from point 7 between the resistors and condensers, this conductor being connected to a suitable rectifier, exemplified by a silicon rectifier diode 8, and so indicated. The rectifier is connected by conductor 9 to a so-called "Zener" diode 10 and to a second Zener diode 11 through a conductor 12. A conductor 13 is connected between the last-mentioned diode and the line conductor C through a condenser 14. The junction between the condenser and the line conductor is designated by the reference character 15. A conductor 17 is taken from a junction point 16 between the second Zener diode and the condenser 14 to a solenoid 18. The latter contains a core indicated at 19, the upper end of which is secured to a single-throw, double-bladed switch 20. When the blades are in the upper position, as shown, connections are established between the line conductors A, A' and B, B' which is the condition when the phases are in proper sequence. But when the line conductors A, B have been accidentally interchanged, so that the conductor A is momentarily connected to B' and the conductor B is connected to A', which is the condition exemplified when the switch 20 is in its lower position to rest on the lower set of contacts 21, 22, the phases will become out of sequence. In case the load is constituted of a motor, the improper phase sequence would reverse the direction of rotation. However, the coil 18, responding to the current through conductor 17 will, for reasons stated hereinafter, operate to move the switch 20 upwardly so as to disconnect A, B' and B, A' to make connection between A, A' and B, B'. This operation will restore the proper phase sequence and assure the proper direction of rotation of the motor.

Operation of the circuit

In order to understand the manner in which the operating current is available at the conductor 17 to operate the solenoid 18, let typical values be assigned to the various resistors, the condensers, the rectifier diode, and the Zener diodes. Assuming that the impressed voltage is 115 volts at 400 c.p.s., the resistances 2, 3 should be approximately 5 kilo-ohms, 1 watt safe load, and the condensers about .082 microfarad, 100 volts A.C. The rectifier diode 8 is preferably of the well-known silicon type and should be able to withstand 400 volts peak inverse and carry 20 milliamperes. The Zener diodes 10 and 11 would normally be approximately 57 volts breakdown while the condenser 14 might have a value of about 3.5 microfarads. The coil 18 should have a resistance of about 10 kilo-ohms and 2.2 milliamperes D.C. pull-in.

The characteristic of a typical Zener diode is shown in FIG. 4. Diodes of this type are procurable on the market and a complete description is given in the current literature. However, referring to the characteristic curve 22 plotted against current and voltage, it will be noted that a diode of this type, which relies on a rectifying junction, exhibits a breakdown phenomenon, sometimes termed an "avalanche" point, shown at the knee 23 when subjected to a relatively high negative voltage. Consequently, when a voltage of positive polarity is applied between the conductors 9 and 13 and this voltage is sufficiently high, the Zener diodes, due to the manner in which they are poled, will operate beyond the knee point 23 of its characteristic. This will allow current rectified at the silicon diode 8, to pass freely through the Zener diodes, notwithstanding the fact they are poled opposite from that of the rectifier. The current will therefore pass unimpeded through a conductor 17 to the coil 18.

Referring to FIG. 1 and assuming that the capacitative network 2, 3, 4, and 5 produces a current at point 7 which leads the impressed voltage, it has been found that the open circuit voltage between 7 and 15, when the phases are in proper sequence, is about 60 volts peak. But, by measurement and vectorially, it can be shown, that when the phase sequence is incorrect, the comparable peak voltage between these points is 222 volts.

This enormous increase in voltage is illustrated by a comparison of the vector diagrams of FIGS. 2 and 3. It is assumed that the reactive network 2, 3, 4 and 5, when connected across phase A, B, would cause current $I_{RC}$ in the network to lead the impressed voltage by 45°. It will be noted that the 60 volts measurement between the points 7, 15 (FIG. 1—when the phases are in correct sequence) is indicated by the vertical vector in FIG. 2 as extending from the junction of vectors $V_C$, $V_R$, to the live conductor C.

The comparable condition in the case of an incorrect sequence of phase is shown in FIG. 3, assuming that the phase A, B has been inadvertently reversed and carried into the vector diagram as B, A. The current $I_{RC}$ will still lead the impressed voltage by 45° due to the condensers 4, 5 and the measured voltage of 222 volts will appear as a vertical vector extending between the junction of vectors $V_C$, $V_R$, and the line conductor C.

This considerable difference in voltages between the points 7, 15, brought about by the capacitative action in conjunction with a three phase circuit which has an incorrect phase sequence, is employed to cause the Zener diodes to "avalanche" or break down and permit the current rectified at 8 to pass and energize the solenoid 18. The condenser 14 serves to bypass any alternating current component which may not have been completely rectified at the element 8.

The switch 20 will then operate to reverse the incorrectly connected phase so as to restore the three phase in proper sequence. The operation of the switch 20 follows practically immediately after the increase in voltage appears across the points 7, 16 and this increase is so phenomenal that the switch is caused to act positively and without fail. It is to be understood that an inductive form of network can be substituted for the capacitative elements 4, 5 and comparable results obtained.

*Visual indicator of incorrect sequence*

As shown in FIG. 1, I may also provide a visual indicator of an improper phase sequence so that correction can be made manually if desired. A tap 22 is brought from the line conductor B to a contact member 23 of a switch generally indicated at 24. A conductor 25 connects the other contact member 26 of the switch to the line 6. The switch has a blade pivoted at 27 which connects through a resistor 28 and a glow lamp 29 to the line conductor C. The operative condition of the lamp can be tested by moving the switch to the left contact 23. When the switch is moved to the right, the 60 volts potential between the points 7 and 15 is not sufficient to cause the lamp to flow from which it can be assumed that the phases are in proper sequence. But an incorrect phase sequence will introduce a large voltage increase between these points due to the presence of the capacitative network, as mentioned hereinbefore, and this increased voltage will cause the lamp to glow. The operator is therefore apprised of an improper connection which should be corrected immediately.

It is evident I have disclosed a three phase system, subject to an incorrect phase sequence and in which this improper sequence can not only be visually tested and manually corrected, but can also be automatically determined and corrected without supervision. I make use of a reactive network to bring about a considerable difference in voltage as between a proper and an improper sequence of phase and use this voltage difference as a rectified current, passing through one or more Zener diodes which break down on the negative side of their characteristic to allow the rectified current to pass to a phase-correcting device.

While a certain specific embodiment has been described, it is obvious that numerous changes may be made without departing from the general principle and scope of the invention.

I claim:

1. In a three phase system three line conductors, an electrical indicator for detecting and correcting an improper phase sequence, said indicator comprising a reactive network connected between two line conductors, a connection from said network to the third line conductor, said connection including a rectifier and at least one Zener diode, said rectifier and diode being poled oppositely, and a connection between the Zener diode and one end of an operating coil, the other end of which is connected to the third line conductor, and means including said coil and responsive to energization thereof through the rectifier for correcting the phase sequence.

2. In a three phase system having three line conductors and in which one of the phases has been reversed, means for correcting the reversal of phase, said means including a connection between two line conductors which connection comprises a resistance element and a reactive element, a connection from a point between said elements to the third line conductor including at least a rectifier and a Zener diode poled oppositely, a conductor taken from the position of said diode in said last-mentioned connection to one end of an operating coil, the other end of the coil being connected to the third line conductor, and an armature in said coil connected to a phase-reversing switch.

3. In a three phase system having three line conductors, a circuit for correcting the phase sequence of the system, said circuit including a network connected across two line conductors, said network including a resistance element and a condenser element, a connection taken from a point between said elements to the third line conductor, said connection including a rectifier and a device which allows rectified current to pass when subjected to a negative voltage above a predetermined minimum, and a conductor extending from said connection at the position of said device to one side of an operating coil, the other side of the coil being connected to the third conductor, an armature operable when said coil is energized through said rectifier to move a switch for changing the connection of one of said line conductors so as to provide the proper phase sequence.

4. In a three phase system having three line conductors and of which one phase is subject to an incorrect phase sequence, means for placing the phase in proper sequence, said means including a reactive network connected between two line conductors and a connection taken from the network to a rectifying device together with a Zener diode, a condenser connected between the diode and the third line conductor, a coil connected across said last-mentioned condenser, and a switching device actuated by said coil for correcting the phase sequence of the system whereby when the potential across the Zener diode caused by the combined effect of the incorrect phase sequence and said reactive circuit becomes greater than the break-down voltage of the diode, said diode becomes conductive and permits the rectifying device to pass current to the coil in order to operate the phase sequence-correcting switch.

5. In a three phase system having three line conductors of which one phase is subject to reversal of one of the phases, means for effecting the proper phase sequence, said means including a resistance element and a capacitative element connected between two of the line conductors, a connection between said last-mentioned means and a rectifier together with a Zener diode, said rectifier and diode being poled in opposite directions with respect to one another, a condenser connected between the diode and the other of the remaining line conductors, the energizing coil of a switch being connected across said last-mentioned condenser, and said switch when actuated, serving to correct the sequence of the incorrect phase.

6. In a three phase system having three line conductors, a visual indicator for detecting an improper phase sequence, said indicator including a reactive network connected between two line conductors, a connection from said network to a contact terminal of a switch having a swivel blade, another contact terminal of the switch being connected direct to one of said two line conductors, one end of said blade being movable between said terminals about a stationary pivot, said pivot being connected through a glow lamp to the third line conductor whereby when the switch is moved to contact the terminal which is connected to said network, the lamp will glow if abnormally high peak voltages are introduced within the system by reason of an improper phase sequence.

7. In a three phase system having three line conductors, a visual indicator for detecting an improper phase sequence, said indicator including a reactive network formed of a resistance and condenser connected in series across two of the line conductors, a connector taken from said network between said resistance and condenser to a contact terminal of a switch having a swivel blade, another contact terminal of the switch being connected to one of said two line conductors, one end of said blade being movable between said terminals about a stationary pivot, said pivot being connected through a glow lamp to the third line conductor whereby when the switch is moved to contact the terminal which is connected to said network, the lamp will glow if abnormally high peak voltages are introduced within the system by reason of an improper phase sequence.

References Cited
UNITED STATES PATENTS

| | | | |
|---|---|---|---|
| 3,156,868 | 11/1964 | Murrills | 324—86 X |
| 3,188,522 | 6/1965 | Culbertson | 317—48 |
| 3,218,485 | 11/1965 | Takai | 317—48 X |
| 3,302,063 | 1/1967 | Leenhouts | 317—47 |

LEE T. HIX, *Primary Examiner.*

MILTON O. HIRSHFIELD, *Examiner.*

J. D. TRAMMELL, *Assistant Examiner.*